United States Patent
Wright et al.

(10) Patent No.: US 10,018,254 B2
(45) Date of Patent: Jul. 10, 2018

(54) BELT DRIVE SYSTEM FOR AN INTERNAL COMBUSTION ENGINE

(71) Applicant: GM GLOBAL TECHNOLOGY OPERATIONS LLC, Detroit, MI (US)

(72) Inventors: Mark W. Wright, Chesterfield Township, MI (US); Constantine R. Checkles, Ann Arbor, MI (US); Daniel D. Cottrell, V, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 252 days.

(21) Appl. No.: 15/167,266

(22) Filed: May 27, 2016

(65) Prior Publication Data

US 2017/0343083 A1    Nov. 30, 2017

(51) Int. Cl.
| | |
|---|---|
| F16H 7/08 | (2006.01) |
| F02B 67/06 | (2006.01) |
| F02B 63/04 | (2006.01) |
| F16H 7/02 | (2006.01) |

(52) U.S. Cl.
CPC .......... *F16H 7/0829* (2013.01); *F02B 63/04* (2013.01); *F02B 67/06* (2013.01); *F16H 7/02* (2013.01); *F16H 2007/0806* (2013.01); *F16H 2007/0812* (2013.01)

(58) Field of Classification Search
CPC combination set(s) only.
See application file for complete search history.

(56) References Cited

U.S. PATENT DOCUMENTS

| | | | |
|---|---|---|---|
| 4,736,931 A | 4/1988 | Christopherson | |
| 7,974,749 B2 | 7/2011 | Zettel et al. | |
| 8,568,259 B2 | 10/2013 | Robbins et al. | |
| 2006/0219040 A1* | 10/2006 | Petri | F16H 7/1281 74/469 |
| 2006/0287146 A1 | 12/2006 | McVicar et al. | |
| 2008/0032842 A1* | 2/2008 | Johnson | F02B 67/06 475/5 |
| 2011/0070985 A1 | 3/2011 | Deneszczuk et al. | |
| 2014/0194236 A1* | 7/2014 | Orita | F16H 7/1281 474/112 |

\* cited by examiner

*Primary Examiner* — William E Dondero
*Assistant Examiner* — Robert T Reese
(74) *Attorney, Agent, or Firm* — Quinn IP Law

(57) ABSTRACT

A belt drive system for rotatably coupling an internal combustion engine to an electric machine is described. The belt drive system includes a serpentine belt and a hydraulic strut tensioner, wherein the hydraulic strut tensioner is disposed to exert a tension force on the serpentine belt. A controller is operatively connected to the electric machine and includes an instruction set that is executable to periodically induce a reduction in torque output of the electric machine.

17 Claims, 2 Drawing Sheets

BELT DRIVE SYSTEM FOR AN INTERNAL COMBUSTION ENGINE

TECHNICAL FIELD

This disclosure relates to belt drive systems for internal combustion engines, and controlling operation thereof.

BACKGROUND

Powertrain systems may include internal combustion engines and non-combustion torque machines, e.g., electric motor/generators to generate torque that can be transferred to a driveline for propulsion power when employed on a vehicle. Torque may be transferred between an internal combustion engine and an electric motor/generator via a pulley system that includes a continuous serpentine belt and one or more belt tensioners. Torque may be transferred from the internal combustion engine to the electric motor/generator or from the electric motor/generator to the internal combustion engine, depending upon operating demands.

SUMMARY

A belt drive system for rotatably coupling an internal combustion engine to an electric machine is described. The belt drive system includes a serpentine belt and a hydraulic strut tensioner, wherein the hydraulic strut tensioner is disposed to exert a tension force on the serpentine belt. A controller is operatively connected to the electric machine and includes an instruction set that is executable to periodically induce a reduction in torque output of the electric machine.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
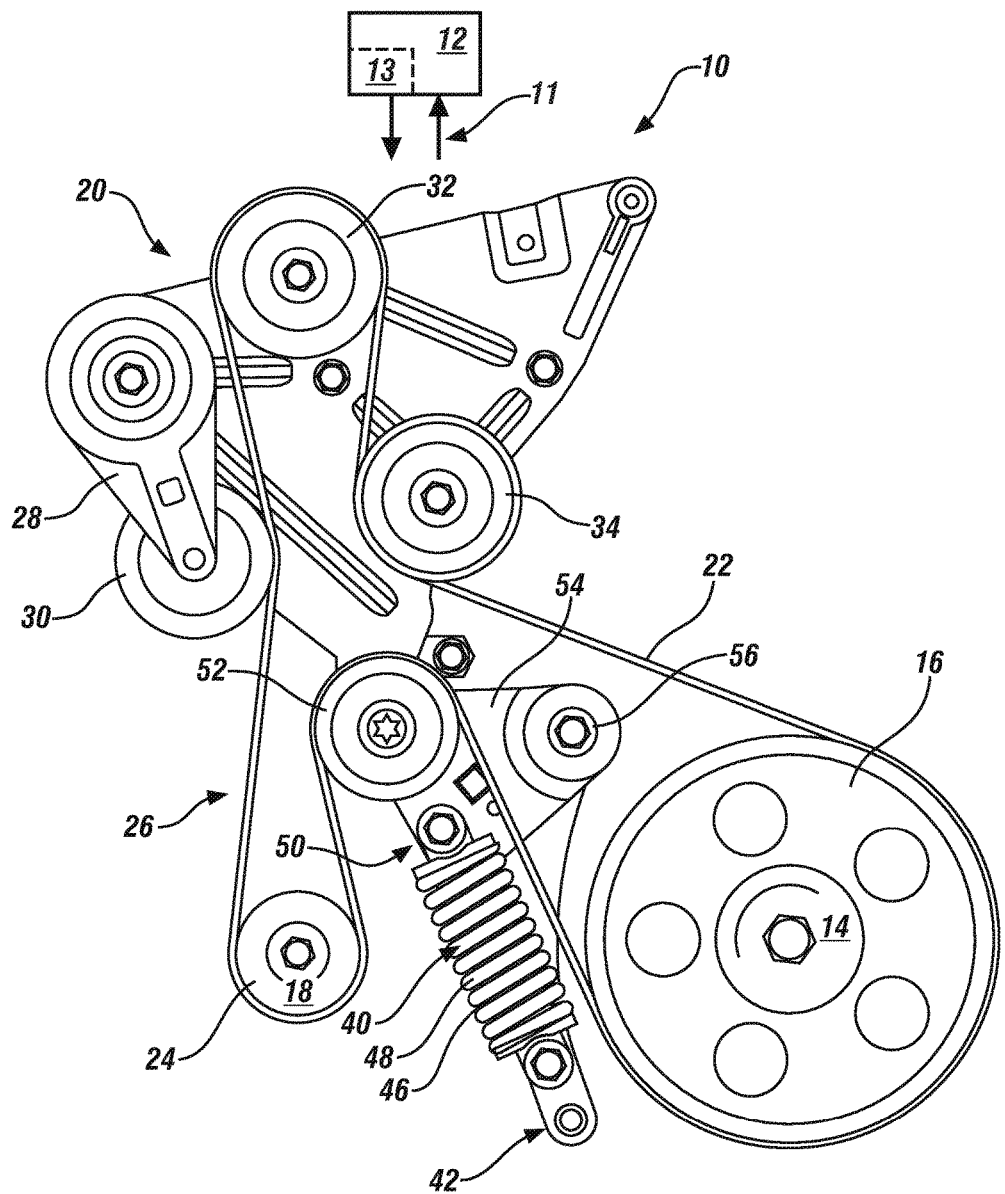
FIG. 1 schematically shows a belt drive system situated on a front portion of an internal combustion engine and rotatably coupled to an electric motor/generator, in accordance with the disclosure.

Referring now to the drawings, which are provided for the purpose of illustrating certain exemplary embodiments only and not for the purpose of limiting the same, FIG. 1 schematically illustrates a belt drive system 20 that is situated on a front portion of an internal combustion engine (engine) 10, wherein the engine 10 is rotatably coupled to an electric motor/generator (electric machine) 18 via the belt drive system 20. In one embodiment, the engine 10 is a prime mover for a powertrain system that is deployed on a vehicle to generate propulsion power. The vehicle may include, by way of non-limiting examples, a passenger vehicle, a light-duty or heavy-duty truck, a utility vehicle, an agricultural vehicle, an industrial/warehouse vehicle, or a recreational off-road vehicle.

The engine 10 may be any suitable internal combustion engine configuration, and is preferably a multi-cylinder internal combustion engine that converts fuel to mechanical torque through a thermodynamic combustion process. The engine 10 is equipped with a plurality of actuators and sensing devices for monitoring operation and delivering fuel to form in-cylinder combustion charges that generate an expansion force that is transferred via pistons and connecting rods to a crankshaft 14 to produce torque. Operation of the engine 10 is controlled by an engine controller (ECM) 12. The crankshaft 14 is coupled to an attached first pulley 16 that is mounted on the front of the engine 10. The engine 10 may include a low-voltage solenoid-actuated electrical starter for engine starting in response to a key-crank event in one embodiment. The engine 10 may be configured to execute engine stop/start operations, including executing autostart and autostop routines during vehicle operation. The engine 10 may be configured to execute autostart and autostop control routines, fuel cutoff (FCO) control routines and cylinder deactivation control routines during ongoing operation. The engine 10 is considered to be in an OFF state when it is not rotating. The engine 10 is considered to be in an ON state when it is rotating, including one or more FCO states in which it is spinning and unfueled. The crankshaft 14 may be coupled to a transmission on the rear of the engine 10, and the transmission may be any suitable device, and is a step-gear transmission that is configured to transfer engine speed and torque at one of a plurality of fixed gear ratios in response to operator inputs in one embodiment.

The electric machine 18 includes a rotor that is coupled to a second pulley 24. The electric machine 18 may be any suitable electric motor/generator device that electrically couples via an inverter to a DC power source, in one embodiment. In one embodiment, the electric machine 18 employs a permanent magnet electric motor configuration. Alternatively, the electric machine 18 employs an induction motor configuration. The electric machine 18 is configured to convert stored electric energy to mechanical power and convert mechanical power to electric energy. The DC power source may be any high-voltage energy storage device, e.g., a multi-cell lithium ion device, an ultracapacitor, or another suitable device without limitation. Alternatively, another non-combustion torque machine, such as a pneumatically-powered device or a hydraulically-powered device may be employed in place of the electric machine 18. By way of definition, a non-combustion torque machine is any device capable of generating torque by converting a potential energy source to kinetic energy without combustion of the potential energy. Non-limiting examples of the potential energy source may include electric energy, pneumatic energy and hydraulic energy. Pneumatically-powered devices and hydraulically-powered devices are known and not described in detail herein.

The belt drive system 20 includes a flexible continuous serpentine belt 22 that is arranged in a belt run 26 that includes the first pulley 16 coupled to the crankshaft 14 and the second pulley 24 coupled to the rotor of the electric machine 18. The belt drive system 20 also preferably includes a mechanical tensioner 28 including a tensioner pulley 30, first and second idler pulleys 32, 34, respectively and a hydraulic strut tensioner 40 including a strut tensioner pulley 52 that are suitably positioned in the belt run 26 over which the serpentine belt 22 travels. The hydraulic strut tensioner 40 is preferably arranged in the belt run 26 between the first pulley 16 and the second pulley 24. The elements of the belt drive system 20 are preferably arranged such that the serpentine belt 22 wraps greater than 180° around the first pulley 16 coupled to the crankshaft 14 and wraps greater than 180° around the second pulley 24 coupled to the rotor of the electric machine 18. The mechanical tensioner 28 and the hydraulic strut tensioner 40 each include a portion that is attached to the front of the engine 10. The first and second idler pulleys 32, 34 are rotatably attached to the front of the engine 10. The serpentine belt 22 is capable of transferring torque in a first direction between the first and second pulleys 16, 24 when the engine 10 operates as a drive element and the electric machine 18 operates as a driven element. The serpentine belt 22 is capable of transferring torque in a second direction opposite to the first direction between the first and second pulleys 16, 24 when the electric machine 18 operates as a drive element and the engine 10 operates as a driven element. Alternatively, the belt drive system 20 may include any suitable configuration that includes a serpentine belt that is arranged to transfer torque between an engine and an electric machine and employs an embodiment of the hydraulic strut tensioner 40 described herein. Other details of the belt drive system 20 are known to those skilled in the art and not described in detail herein.

The hydraulic strut tensioner 40 is a linear tensioning device that preferably includes a compression coil spring 48 preferably arranged in parallel with a hydraulic damping cylinder 46 between a first end 42 and a second end 50. In one embodiment, the hydraulic damping cylinder 46 is a one-way fluidic damping cylinder that preferably includes a piston disposed in a fluid-filled cylinder. The first end 42 of the hydraulic strut tensioner 40 preferably includes an eye portion that attaches via a stud or another device to the front of the engine 10. The second end 50 of the hydraulic strut tensioner 40 preferably includes an eye portion that attaches to a first corner of a triangular-shaped plate 54. The plate 54 also includes a second corner that includes a pivot point 56 that is attached to the front of the engine 10. The plate 54 also includes a third corner on which the second pulley 52 is rotatably attached. As such, the plate 54 is arranged to allow the hydraulic strut tensioner 40 to exert a tension force upon the serpentine belt 22, while limiting rotational movement of the hydraulic strut tensioner 40 around the first end 42 and permitting linear movement of the second end 50 of the hydraulic strut tensioner 40. The hydraulic damping cylinder 46 may be characterized in terms of a damping coefficient (Ns/m) and the compression coil spring 48 may be characterized in terms of a spring constant (N/m). Selections of the spring constant for the compression coil spring 48 and the damping coefficient for the hydraulic damping cylinder 46 are application-specific, with parameters related to their selection known to one of ordinary skill in the art.

The hydraulic strut tensioner 40 has an extension range between a minimum displacement that is associated with a fully compressed state and a maximum displacement that is associated with a fully extended or unsprung state. The compression coil spring 48 of the hydraulic strut tensioner 40 preferably exerts unrestricted extension forces between the first end 42 and the second end 50 that may be determined in relation to its spring constant. The hydraulic damping cylinder 46 resists and dampens linear movement in response to compressive forces that may be exerted on the first end 42 and the second end 50. As such, the hydraulic strut tensioner 40 preferably exhibits an asymmetric response to forces that may be exerted on the first end 42 and the second end 50. This includes a relatively slow compression time for displacement in response to compressive forces, wherein the slow compression time response may be determined based upon the spring constant of the compression coil spring 48 in combination with the damping coefficient of the hydraulic damping cylinder 46. This also includes a relatively fast extension time for displacement in response to removal of any compressive forces, wherein the fast extension time response may be determined based only upon the spring constant of the compression coil spring 48 with minimal contribution from the hydraulic damping cylinder 46. The asymmetric slow compression time response and fast extension time response enable the hydraulic strut tensioner 40 to exert belt tension when the electric machine 18 is operating as a drive element and when the electric machine 18 is operating as a driven element.

A controller 12 is in communication with sensors and also in communication with actuators to control operation of the engine 10 and the electric machine 18 in response to operator commands. The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or any other suitable communication link, and is indicated by lines 11. Communication includes exchanging data signals in any suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to any physically discernible indicator that conveys information, and may be any suitable waveform (e.g., electrical, optical, magnetic, mechanical or electromagnetic), such as DC, AC, sinusoidal-wave, triangular-wave, square-wave, vibration, and the like, that is capable of traveling through a medium.

Figure 2:
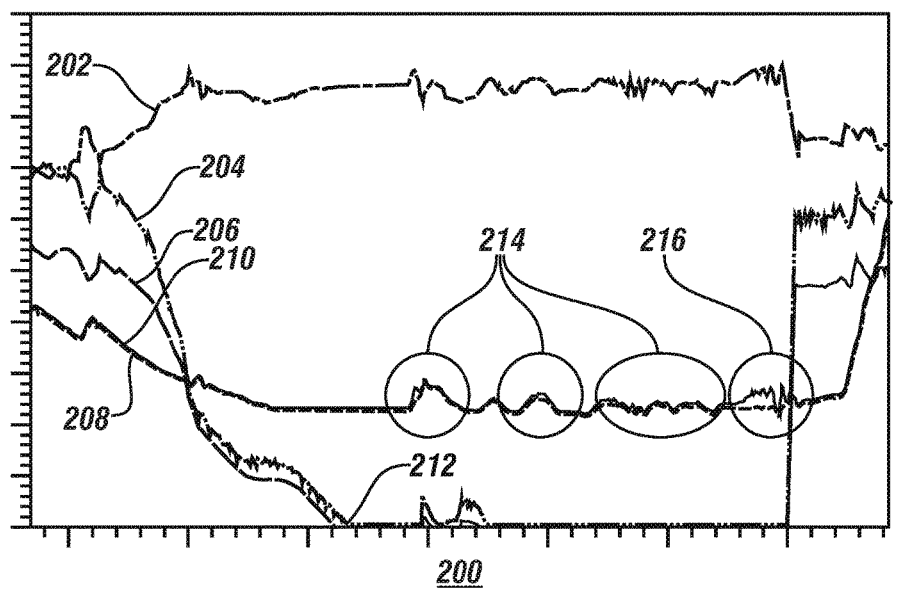
FIG. 2 graphically shows data associated with operation of the system described with reference to FIG. 1, wherein the electric motor/generator is operating as a drive element and the internal combustion engine is operating as a driven element, without benefit of the control concepts described herein.

Under certain operating conditions, such as when the electric machine 18 operates as a drive element and the engine 10 operates as a driven element, the hydraulic strut tensioner 40 may reach its minimum displacement associated with the fully compressed state. Coincidently, the mechanical tensioner 28 may achieve the end of its authority. This may include, e.g., the engine 10 operating in the FCO mode with the serpentine belt 22 transferring torque in the second direction between the electric machine 18 and the engine 10. In such operating conditions, the serpentine belt 22 may slip around the second pulley 24 of the electric machine 18. By way of a non-limiting example, this operating condition may include operation during an extended motoring event wherein the engine 10 is operating in an FCO mode and the electric machine 18 is generating torque, which may result in the hydraulic strut tensioner 40 reaching its minimum displacement and the mechanical tensioner 28 reaching its minimum displacement, which causes the mechanical tensioner 28 to travel to a free arm position and minimize backside tension on the serpentine belt 22. An example of an embodiment of the engine 10 operating under this operating condition is shown with reference to FIG. 2. FIG. 2 graphically shows, in relation to time 200, motor torque 202 and motor speed 210 from the electric machine 18, engine speed 208 from the engine 10, displacement (MAT) 204 of mechanical tensioner 28 and displacement (HAT) 206 from the hydraulic strut tensioner 40.

As indicated with reference to the results shown in FIG. 2, the MAT 204 and HAT 206 are reducing as the motor torque 202 increases, until the MAT 204 and HAT 206 reach minimum displacements, as indicated at point 212. Small belt slip events 214 are indicated thereafter, and a gross belt slip event is indicated at 216. The small belt slip events 214 and the gross belt slip event 216 are caused when the torque exerted by the electric machine 18 on the pulley 24 exceeds the friction forces exerted on a portion of the belt 22 around the pulley 24 by the mechanical tensioner 28 and the hydraulic strut tensioner 40. The belt slip events are characterized by a divergence between the engine speed 208 and the motor speed 210.

A control routine 13 is advantageously executed by the controller 12 to control operation of the electric machine 18 to minimize likelihood of occurrence of belt slip events. The control routine 13 preferably operates under conditions that include the electric machine 18 operating as a drive element, i.e., in a torque-generative state, and the engine 10 operating in the FCO mode, wherein such operation occurs for an extended period of time. The control routine 13 may also operate under other conditions that include the electric machine 18 operating as a driven element, i.e., in an electric power generation state, and the engine 10 operating to generate torque, wherein such operation results in a belt slip event. The extended period of time is preferably calibratable, and relates to the time response associated with displacement and recovery of the hydraulic strut tensioner 40 when under compression. The extended period of time may be in the order of magnitude of 5 seconds in one embodiment. By way of a non-limiting example, the control routine 13 may operate only after the electric machine 18 is operating as a drive element and the engine 10 is operating in the FCO mode for a period of at least 5 seconds, thus exerting a linear force on the serpentine belt 22 that translates to a compressive force on the hydraulic strut tensioner 40.

Operation of the control routine 13 includes periodically inducing a pulsed reduction in a commanded motor torque that is output from the electric machine 18, wherein the pulsed reduction in the commanded motor torque is sufficient to reduce the compressive force exerted on the hydraulic strut tensioner 40 by the electric machine 18 via the serpentine belt 22. Reducing the compressive force exerted on the hydraulic strut tensioner 40 permits the mechanical tensioner 28 and the hydraulic strut tensioner 40 to react and recover to exert belt tension when the electric machine 18 is operating as a drive element. The magnitude and time period of the pulsed reduction in the commanded motor torque are preferably indirectly related to the spring constant of the compression coil spring 48. This includes selecting a magnitude and time period of the pulsed reduction in the commanded motor torque that are relatively low when the spring constant of the compression coil spring 48 is high, and selecting a magnitude and time period of the pulsed reduction in the commanded motor torque that are relatively high when the spring constant of the compression coil spring 48 is low. The repetition rate of the periodically induced reduction in torque output of the electric machine 18 is determined based upon the spring constant of the compression coil spring 48 and the damping coefficient of the hydraulic damping cylinder 46. By way of a non-limiting example, the pulsed reduction in the commanded motor torque can be a 5 Nm torque reduction for a torque pulse lasting 50 ms at a repetition rate of 4 seconds for one embodiment of the compression coil spring 48.

Figure 3:
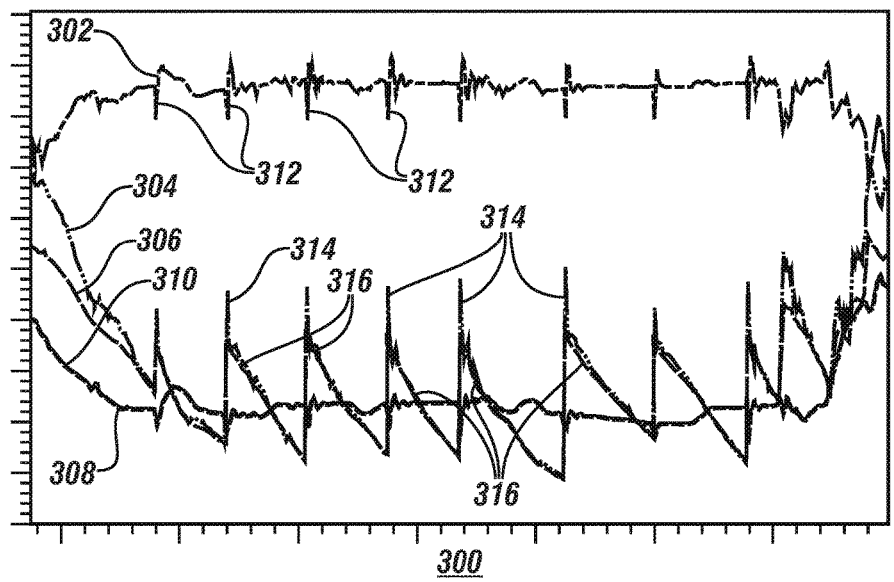
FIG. 3 graphically shows data associated with operation of the system described with reference to FIG. 1, wherein the electric motor/generator is operating as a drive element and the internal combustion engine is operating as a driven element, employing a control routine described herein, in accordance with the disclosure.

FIG. 3 graphically shows, in relation to time 300, motor torque 302 and motor speed 310 from the electric machine 18, engine speed 308 from the engine 10, displacement (MAT) 304 of mechanical tensioner 28 and displacement (HAT) 306 from the hydraulic strut tensioner 40 under conditions that include the electric machine 18 operating as a drive element and the engine 10 operating in the FCO mode for an extended period of time. The graph of FIG. 3 indicates that the MAT 304 and HAT 306 are initially reducing as the motor torque 302 increases. After a period of 5 seconds in such operation, a pulsed reduction in the commanded motor torque is commanded, indicated by element 312. The pulsed reduction in the commanded motor torque is a 5 Nm torque reduction for a pulse lasting 50 ms at a repetition rate of 4 seconds in one embodiment. As indicated, the MAT 304 and HAT 306 displacements exhibit sawtooth-type characteristics 314, 316, respectively, but do not reach minimum displacements. The sawtooth-type characteristics 314, 316 are a result of the asymmetric response of the hydraulic strut tensioner 40. As such, no belt slip events occur, as indicated by an absence of a divergence between the engine speed 308 and the motor speed 310.

While the concepts described herein are susceptible of embodiment in many different forms, elements and limitations that are disclosed, for example, in the Abstract, Summary, and Detailed Description sections, but not explicitly set forth in the claims, are not to be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the word "including" means "including without limitation."

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects. Furthermore, the present disclosure may take the form of a computer program product embodied in any tangible medium of expression having computer-usable program code embodied in the medium.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A belt drive system for an internal combustion engine rotatably coupled to an electric machine, comprising:
   a serpentine belt disposed in a belt run that includes a first pulley coupled to the internal combustion engine and a second pulley coupled to the electric machine, and a hydraulic strut tensioner disposed to exert a tension force on the serpentine belt; and
   a controller operatively connected to the electric machine, wherein the controller includes an instruction set, the instruction set being executable to periodically induce a reduction in torque output of the electric machine.

2. The belt drive system of claim 1, wherein the instruction set is executable to periodically induce the reduction in torque output of the electric machine when the electric machine is operating in a torque generating state.

3. The belt drive system of claim 2, wherein the instruction set is executable to periodically induce the reduction in the torque output of the electric machine when the electric machine is operating in the torque generating state for an extended period of time.

4. The belt drive system of claim 1, wherein the hydraulic strut tensioner comprises a linear tensioning device including a compression coil spring arranged in parallel with a hydraulic damping cylinder; and
   wherein the reduction in the torque output of the electric machine includes a pulsed reduction in the torque output having a magnitude and a time period that are determined based upon a spring constant of the compression coil spring.

5. The belt drive system of claim 4, wherein the magnitude and time period of the pulsed reduction in the commanded motor torque are indirectly related to the spring constant of the compression coil spring.

6. The belt drive system of claim 1, wherein the hydraulic strut tensioner comprises a linear tensioning device including a compression coil spring arranged in parallel with a hydraulic damping cylinder; and
   wherein a repetition rate of the periodically induced reduction in torque output of the electric machine is determined based upon a spring constant of the compression coil spring and a damping coefficient of the hydraulic damping cylinder.

7. An internal combustion engine, comprising:
   a belt drive system disposed to rotatably couple a crankshaft of the internal combustion engine and an electric machine, wherein the belt drive system includes a serpentine belt and a hydraulic strut tensioner, wherein the hydraulic strut tensioner is disposed to exert a force on the serpentine belt; and
   a controller operatively connected to the electric machine, wherein the controller includes an instruction set, the instruction set being executable to periodically induce a reduction in torque output of the electric machine when the electric machine is operating in a torque generating state.

8. The internal combustion engine of claim 7, wherein the instruction set is executable to periodically induce the reduction in the torque output of the electric machine when the electric machine is operating in the torque generating state for an extended period of time.

9. The internal combustion engine of claim 7, wherein the hydraulic strut tensioner comprises a linear tensioning device including a compression coil spring arranged in parallel with a hydraulic damping cylinder; and
   wherein the reduction in the torque output of the electric machine includes a pulsed reduction in the torque output having a magnitude and a time period that are determined based upon a spring constant of the compression coil spring.

10. The internal combustion engine of claim 9, wherein the magnitude and time period of the pulsed reduction in the commanded motor torque are indirectly related to the spring constant of the compression coil spring.

11. The internal combustion engine of claim 7, wherein the hydraulic strut tensioner comprises a linear tensioning device including a compression coil spring arranged in parallel with a hydraulic damping cylinder; and
    wherein a repetition rate of the periodically induced reduction in torque output of the electric machine is determined based upon a spring constant of the compression coil spring and a damping coefficient of the hydraulic damping cylinder.

12. A method for controlling operation of an electric machine that is rotatably coupled to an internal combustion engine via a belt drive system, wherein the belt drive system includes a hydraulic strut tensioner, the method comprising:
    operating the electric machine in a torque generating state; and
    periodically inducing, via a controller, a pulsed reduction in a commanded torque output from the electric machine when the electric machine operates in the torque generating state for an extended period of time.

13. The method of claim 12, comprising periodically inducing the reduction in torque output of the electric machine when the electric machine is operating in a torque generating state.

14. The method of claim 13, comprising periodically inducing the reduction in the torque output of the electric machine when the electric machine is operating in the torque generating state for an extended period of time.

15. The method of claim 12, wherein the hydraulic strut tensioner comprises a linear tensioning device including a compression coil spring arranged in parallel with a hydraulic damping cylinder; and
    wherein periodically inducing the pulsed reduction in the commanded torque output of the electric machine includes inducing a pulsed reduction in the torque output having a magnitude and a time period that are determined based upon a spring constant of the compression coil spring.

16. The method of claim 15, wherein the magnitude and time period of the pulsed reduction in the commanded motor torque are indirectly related to the spring constant of the compression coil spring.

17. The method of claim 12, wherein the hydraulic strut tensioner comprises a linear tensioning device including a compression coil spring arranged in parallel with a hydraulic damping cylinder; and wherein a repetition rate of the periodically induced reduction in torque output of the electric machine is determined based upon a spring constant of the compression coil spring and a damping coefficient of the hydraulic damping cylinder.

\* \* \* \* \*